United States Patent Office 3,538,044
Patented Nov. 3, 1970

3,538,044
DIMERCAPTAN DERIVATIVES AS SYNERGISTS
FOR POLYOLEFIN STABILIZATION
Bernard Buchholz, Blue Bell, and Murray Hauptschein,
Glenside, Pa., assignors to Pennwalt Corporation, a corporation of Pennsylvania
No Drawing. Filed Aug. 11, 1967, Ser. No. 659,864
Int. Cl. C08f 45/58, 45/60, 45/62
U.S. Cl. 260—45.75
8 Claims

ABSTRACT OF THE DISCLOSURE

Polyolefins containing as a stabilizer, a synergistic combination of a phenolic or amine antioxidant and a solid, metal mercaptide of a cycloaliphatic dimercaptan selected from the group of

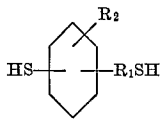

where $R_1$ is an alkylene group of one to six carbon atoms and $R_2$ is H or lower alkyl and

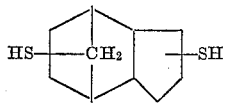

Polyolefins, particularly polyethylene and polypropylene require the addition of stabilizers to protect them from thermal oxidation during high temperature processing operations and subsequent use. Polypropylene is particularly sensitive to oxidation due to its branched-chain structure and it requires efficient antioxidants for adequate stabilization.

It is known to use hindred phenols as stabilizers for polyolefins and arylamines or arylenediamines are also used as antioxidants where staining due to the amine is not objectionable. It is also known to use various synergists with these materials to improve their performance. The literature survey "Thermal, Oxidative and Light Stabilization of Polypropylene," Science Surveys, Mountainside, N.J. (1966) discloses numerous synergists for phenols and amines to stabilize polypropylene. However, in spite of the large amount of research effort that has been applied to the problem of obtaining satisfactory stabilization of polyolefins, there is still needed more efficient and more economical means to provide stabilized olefin polymers.

We have discovered a synergistic combination which is remarkable in its extremely high efficiency and low cost in providing stabilized polyolefins. More particularly, we have found that polyolefins may be stabilized with a conventional hindered phenol, arylamine, or arylenediamine, and as a synergistic additive a metal mercaptide, more specifically the zinc, cadmium mercury, lead, antimony, bismuth, cobalt, or nickel mercaptide, of a cycloaliphatic dimercaptan selected form the group of

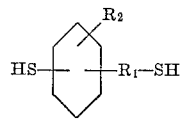

where $R_1$ is a straight or branched alkylene group of one to six carbon atoms and $R_2$ is H or lower alkyl (i.e. 1 to 4 carbon atoms) and

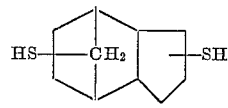

The synergists are much more effective than the well known synergist dilaurylthiodipropionate which is now the synergist of choice in the industry.

The particular polyolefins which are to be treated in accord with this invention are hydrocarbon polymers such as polyethylene, both conventional and the more recent higher density materials, polypropylene, polybutene-1, poly-3-methyl-butene-1, poly-4-methylpentene-1, poly-4, 4-dimethylpentene-1, polydodecene-1, and poly-3-methyl-pentene-1, polybutadiene, polystyrene etc. It will be understood, of course, that polymers derived from mixture of appropriate olefins such as styrene-butadiene or ethylene-propylene-dicyclopentadiene may also be treated in accordance with the invention. Preferably, however, the invention will be applied to polyethylene and polypropylene materials.

The conventional phenolic antioxidants which will be used with the olefinic polymers will include both monohydric and polyhydric phenols and include bis-phenols, tris-phenols and tetrakis-phenols.

Monohydric phenols useful in the invention include those disclosed in U.S. 2,581,907 and include the following:

2,4-dimethyl-6-t-butylphenol
2,4-dimethyl-6-(alpha, alpha, gamma, gamma-tetra methylbutyl)phenol
2,6-di-t-butyl-4-methylphenol
2-methyl-4,6-di-t-butylphenol
2,6-di-t-butyl-4-sec-butylphenol
2,4,6-tri-t-butylphenol
2,4,6-triethylphenol
2,4,6-tri-n-propylphenol
2,4,6-triisopropylphenol
2,6-di-t-octyl-4-propylphenol
2,6-di-t-butyl-4-ethylphenol
2,4-dicyclohexyl-6-methylphenol
2-isopropyl-4-methyl-6-t-butylphenol
2,4-dimethyl-6-t-amylphenol
2,4-di-t-amyl-6-methylphenol
2,6-di-t-butyl-4-isopropylphenol
2,6-di-t-amyl-4-methylphenol
2,6-di-t-amyl-4-isopropylphenol
2,4-diisopropyl-6-t-butylphenol, and
2,4-diisopropyl-6-sec-hexylphenol.

The preferred compounds of this class are those which have secondary or tertiary alkyl groups at the 2- and 6-position and a normal alkyl group at the 4-position, a representative of this class being 2,6-di-t-butyl-p-cresol. More preferably, the normal alkyl group in the 4-position is one containing from about 1 to 20 carbon atoms while the secondary or tertiary alkyl groups in the 2- and 6-positions each contain from about 3 to 20 carbon atoms. Any of the dialkylphenols are suitable; particularly preferred is the 2,6-di-t-butylphenol. The bisphenols are characterized by the general formula

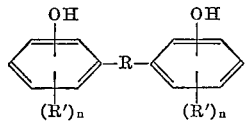

wherein R is an alkylidene radical of 1 to 5 carbon atoms, or is an ether or thioether group, and wherein R' is an alkyl group of 1 to 12 carbon atoms and $n$ is an integer from 1 to 3. When more than one R' substituent is present on a phenyl group, each R' can be the same or different.

Exemplary of these alkylidene-bis(alkylphenols) that may be used are 2,2'-methylene-bis(5-isopropylphenol),
2,2'-methylene-bis(4-methyl-6-isopropylphenol),
2,2'-methylene-bis(4-methyl-6-t-butylphenol),
2,2'-methylene-bis(4-t-butyl-6-methylphenol),
2,2'-methylene-bis(4,6-di-t-butylphenol),
2,2'-methylene-bis(4-nonylphenol),
4,4'-methylene-bis(2,6-di-t-butylphenol),
2,2'-isopropylidene-bis(5-methylphenol),
4,4'-methylene-bis(2-methyl-6-t-butylphenol),
2,2'-ethylidene-bis(4-methyl-6-t-butylphenol),
2,2'-ethylidene-bis(4,6-di-t-butylphenol),
2,2'-ethylidene-bis(4-octylphenol),
2,2'-ethylidene-bis(4-nonylphenol),
2,2'-isopropylidene-bis(4-methyl-6-isopropylphenol),
2,2'-isopropylidene-bis(4-isopropylphenol),
2,2'-isopropylidene-bis(4-isopropyl-6-methylphenol),
2,2'-isopropylidene-bis(4-methyl-6-t-butylphenol),
2,2'-isopropylidene-bis(4-octylphenol)
2,2'-isopropylidene-bis(4-nonylphenol),
2,2'-isopropylidene-bis(4-decylphenol),
2,2-isobutylidene-bis(4-methyl-6-t-butylphenol),
2,2'-isobutylidene-bis(4-nonylphenol),
4,4'-butylidene-bis(3-methyl-6-t-butylphenol),
1,1'-thiobis-(2-naphthol),
Bis(3,5-di-tert-butyl-4-hydroxybenzyl)ether,
2,2'-thiobis-(4-methyl-6-tert-butylphenol),
4,4'-thiobis-(-5-methyl-2-tert-butylphenol).

Of the tris-phenols useful 1,3,5-trimethyl-2,4,6-tris(3,5-di-tertiary-butyl - 4 - hydroxybenzyl)benzene, 1,3,5 - trimethyl - 2,4,6 - tris(3,5-di-isopropyl - 4 - hydroxybenzyl)benzene and the like are typical.

Tetrakis-phenols useful are exemplified by compounds such as those of structure

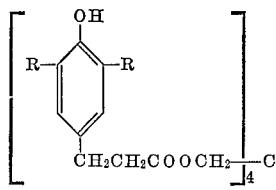

where R is lower alkyl. Preferred within this group is the compound where R is t-butyl.

The arylamines and arylene diamines which are conventionally used as antioxidants are illustrated by the substituted naphthylamines or substituted p-phenylenediamines. These and other antioxidants are described in the second edition of the Kirk-Othmer Encyclopedia of Chemical Technology, vol. 2, p. 600.

The particular synergistic additives used in the invention are as indicated, certain metal mercaptides of the cycloaliphatic mercaptans described above. These mercaptans are readily prepared by known methods.

For example, the free radical catalyzed addition of $H_2S$ to d-limonene yields d-limonene dimercaptan

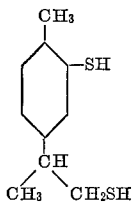

where $R_2$ in the above formula is methyl and $R_1$ is

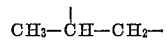

Likewise dipentene plus $H_2S$ gives a dimercaptan (see U.S. 3,257,302) useful for this invention. The compounds β-mercaptoethyl-3(and 4)-mercaptocyclohexane

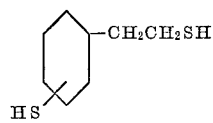

and α-mercaptoethyl-3(and 4)-mercaptocyclohexane

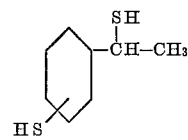

made by free radical or ionic addition respectively of $H_2S$ to vinylcyclohexane are also useful for this invention. The dicyclopentane-5 (and 6), 2 (and 3)-dithiols of structure

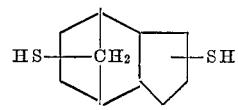

are obtained by ionic or free radical addition of $H_2S$ to dicyclopentadiene and are also useful for this invention.

These dimercaptans are readily converted to the appropriate metal mercaptides by reaction with the salts of a divalent metal, e.g., the acetates, chlorides, etc., of zinc, cadmium, mercury, lead, antimony, bismuth, cobalt or nickel in accordance with the procedure set forth in U.S. 3294,761. It is probable that the metal mercaptides made by reacting the metal salt, such as the acetate with the mercaptan in a solvent in accord with U.S. 3,294,761 are polymeric in nature and may be characterized by the structure

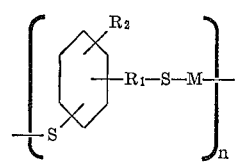

where $R_1$ and $R_2$ are defined above, where M is a metal as set forth above, and where $n$ is an integer. These dimercaptide products are particularly desirable because they are solids and have lower volatility and less odor than any of the liquid mercaptans or disulfides. Thus, they are easier to mix with the polyolefin in conventional processing equipment. These metal dimercaptides have only very slight, if any, antioxidant effects when used alone but, surprisingly serve as synergists for the conventional phenolic and amine antioxidants. The preferred synergists of the invention are those made from d-limonene di-mercaptan and from α and β-mercaptoethyl-3) and 4-) mercaptocyclohexane and their preferred metal is zinc.

It will be understood that the amount of conventional antioxidant and synergistic additive used in the processing of the polyolefin will be a minor amount, and preferably the total of the two agents will range from about 0.05% to about 1.0% of the polyolefin material. The ratio of the conventional antioxidant to the synergist can vary over a wide range with either component used in excess. In general, it is preferred to use a ratio of antioxidant: synergist of 1:1 to 1:9.

It will be also understood that conventional processing techniques for the polyolefin will be used and other additives may be added in accord with customary practice.

Evaluation of the compounds is made by an accelerated oxidation test apparatus based on that described by Hawkins et al., J. Applied Polymer Sci. 1 37 (1959) and consists essentially of an oven maintained at 140° C. into which glass tubes containing the test samples can be inserted. To the glass sample tubes are attached gas burettes and water leveling bulbs. The air in the sample tubes is evacuated and replaced by oxygen. The oxygen uptake at atmospheric pressure is measured by water displacement in the gas burettes. All samples were run in duplicate and corrected against blanks to compensate for fluctuations in oven temperature and atmospheric pressure.

Oxygen absorption indicates sample deterioration due to loss in effectiveness of the stabilizer. The induction period (time when oxygen absorption begins) is the most accurate measure of stabilizer effectiveness, since certain desirable properties of the polypropylene may be destroyed after the absorption of relatively small amounts (e.g. 5–10 cc.) of oxygen per gram of polypropylene. Comparisons of the observed induction periods (oxygen atmosphere, 140° C.) are given below:

TABLE I

| Example No. | Additive to polypropylene (percent by weight) | Induction period (hrs.) |
|---|---|---|
| 1 | None | 1 |
| 2 | 0.1% zinc mercaptide of d-limonene dimercaptan | 16 |
| 3 | 0.1% Antioxidant 2246 [1] | 194 |
| 4 | 0.1% Antioxidant 2246 plus 0.1% DLTDP [2] | 260 |
| 5 | 0.1% Antioxidant 2246 plus 0.1% zinc mercaptide of d-limonene dimercaptan | 620 |
| 6 | 0.1% Ionox 330 [3] | 112 |
| 7 | 0.1% Ionox 330 plus 0.1% DLTDP [4] | 295 |
| 8 | 0.1% Ionox 330 plus 0.1% zinc mercaptide of d-limonene dimercaptan | 430 |
| 9 | 0.1% Ionox 330 plus 0.1% cadmium mercaptide of d-limonene dimercaptan | 370 |
| 10 | 0.1% Ionox 330 plus 0.1% of zinc mercaptide of β-mercaptoethyl-3 (and 4)-mercaptocyclohexane | 400 |
| 11 | 0.1% Irganox [5] 1010 plus 0.1% DLTDP [2] | 495 |
| 12 | 0.1% Irganox 1010 plus 0.1% zinc mercaptide of d-limonene dimercaptan | 920 |

[1] Antioxidant 2246 is 2,2′-methylenebis(4-methyl-6-tert-butylphenol), a commercial antioxidant.
[2] DLTDP is dilaurylthiodipropionate, a commercial synergist.
[3] Ionox 330 is 1,3,5-trimethyl-2,4,6-tris(3,5-di-tert-butyl-4-hydroxylbenzyl) benzene, a commercial antioxidant.
[4] This combination of antioxidant and synergist is currently one of the most widely used systems in the trade.
[5] Irganox is a commercial antioxidant having a tetrakis phenol structure identified by the manufacturer as tetrakis [methylene(3,5-di-tert-butyl-4-hydroxyhydrocinnamate)] methane.

As can be observed from the above table the synergistic combination of this invention is far superior to the combination currently preferred (compare Example 4 with Example 5, Example 7 with Examples 8, 9 and 10, and Example 11 with Example 12).

When polyethylene is compounded with the zinc mercaptide of d-limonene dimercaptan and 2,4-di-tert-butyl-p-cresol (Ionol), as in the above examples, a strong synergistic effect on retarding oxidation of the polyethylene is likewise observed. Similarly the mercury, lead, antimony, bismuth, cobalt and nickel mercaptides of d-limonene dimercaptan and of β-mercaptoethyl-3 (and 4)-mercaptocyclohexane show synergistic effects with Ionox 330, with N,N′-diphenyl-p-phenylenediamine, with N,N′-di-2-naphthyl-p-phenylenediamine, and with N,N′-di-tertiary-nonyl-p-phenylenediamine.

When the zinc dimercaptide made from dicyclopentane-5 (and 6), 2 (and 3)-dithiol is used as a synergist with Ionox (0.1% each) in polyethylene, a similar high synergistic effect is obtained.

Another unexpected feature of the synergists of this invention is their ability to prevent discoloration imparted to the polyolefins by certain of the antioxidants during high temperature processing operations. For example, the phenolic antioxidant 2246 often causes discoloration in polypropylene, but when used with the synergist of this invention no such discoloration is observed.

It will be understood that numerous changes and variations may be made from the above description and examples without departing from the spirit and scope of the invention.

We claim:
1. A composition of matter comprising
   (A) a polyolefin;
   (B) an antioxidant selected from the group consisting of hindered monohydric phenols and hindered polyhydric phenols containing 1 to 4 phenol nuclei, aryl monoamines and arylene diamines; and
   (C) a metal mercaptide polymer prepared by reacting a dimercaptan having the formula
   wherein

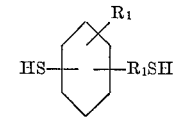

$R_1$ is an alkylene group of 1 to 6 carbon atoms;
$R_2$ is hydrogen or lower alkyl; or

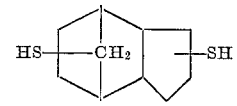

with a soluble bivalent metal salt selected from those of the formula MeX wherein Me is a metal selected from the group consisting of zinc, cadmium, mercury, lead, antimony, bismuth, cobalt, and nickel; and X is an anion selected from the group consisting of acetate, chloride, formate, propionate, bromide, iodide, fluoride, and sulfate; at a temperature in the range of from 50° F. to 200° F. and a pressure in the range of 0 to 20 p.s.i.g., and thereafter recovering the insoluble solid polymer as a product of the process.

2. The composition of claim 1 wherein the polyolefin is polypropylene.

3. The composition of claim 1 wherein the polyolefin is polyethylene.

4. The composition of claim 1 wherein the polymer is polypropylene, the antioxidant is a hindered phenol and the mercaptide is the zinc mercaptide of d-limonene dimercaptan.

5. The composition of claim 1 wherein the polymer is polypropylene, the antioxidant is a hindered phenol and the mercaptide is the cadmium mercaptide of d-limonene dimercaptan.

6. The composition of claim 1 wherein the antioxidant is a hindered phenol and the mercaptide is the zinc mercaptide of β-mercaptoethyl-3 (and 4)-mercaptocyclohexane.

7. The composition of claim 1 wherein the antioxidant is a hindered phenol and the mercaptide is the cadmium mercaptide of β-mercaptoethyl-3 (and 4)-mercaptocyclohexane.

8. The composition of claim 1 wherein the antioxidant is a hindered phenol and the mercaptide is the zinc mercaptide of dicyclopentane-5 (and 6), 2 (and 3)-dithiol.

References Cited

UNITED STATES PATENTS

| | | | |
|---|---|---|---|
| 2,340,938 | 2/1944 | Daly | 260—45.75 |
| 2,581,907 | 1/1952 | Smith et al. | 260—45.75 |
| 3,025,327 | 3/1962 | May | 260—45.7 |
| 3,181,971 | 5/1965 | Rayner | 260—45.75 |
| 3,294,761 | 12/1966 | Warner | 260—79 |
| 2,310,349 | 2/1943 | Lightkown | 260—45.75 |

DONALD E. CZAJA, Primary Examiner

V. P. HOKE, Assistant Examiner

U.S. Cl. X.R.

252—401, 404, 406; 260—45.9, 45.95